Nov. 12, 1940.  C. P. TEEPLE  2,221,496

SEALING MEANS FOR LIQUIDS

Filed Aug. 26, 1939

INVENTOR.
Charles P. Teeple
BY
Chritton, Niles, Davis, Hirsche & Dawson
ATTORNEYS.

Patented Nov. 12, 1940

2,221,496

UNITED STATES PATENT OFFICE 2,221,496

SEALING MEANS FOR LIQUIDS

Charles P. Teeple, Park Ridge, Ill., assignor to Crane Packing Company, Chicago, Ill., a corporation of Illinois Application August 26, 1939, Serial No. 292,133

1 Claim. (Cl. 288—2)

This invention relates to improvements in sealing means for liquids, such, for example, as water pump seals.

It has been proposed heretofore to provide a seal in the form of a ring having a smooth, flat surface, said ring being constructed of hard, anti-friction material such as Bakelite, carbon, or as an alternative, certain non-abrasive metals or alloys. These rings rotate against a flat, annular, fixed surface such as a part of the housing of an automobile water pump and are yieldingly held against their seats by a coil spring which rotates with the hub of the impeller. As an alternative arrangement, the ring is sometimes held against rotation and engages a flat, annular surface on the impeller.

In either case, the leakage at one location is sealed by the relatively rotating annular surfaces and leakage in another direction is sealed by a second means or packing ring which engages a cylindrical surface concentric with the axis of the shaft.

The present improvement is directed, in general, to the second sealing means and comprises a flexible unit consisting of a collar of waterproof material such as rubber or preferably the synthetic compound known as Neoprene, and a spring member surrounding said collar.

The object of the invention is to provide a seal of this character which is of simple form, may be manufactured cheaply and one which maintains an effective seal against the leakage of various liquids, including water and oil.

The assembly shown includes part of a conventional automobile water pump modified to receive the sealing means of this invention. Said sealing means, however, is adapted to other types of pumps and to classes of service other than pumps and also where leakage of liquids other than water is to be prevented.

Figure 1:
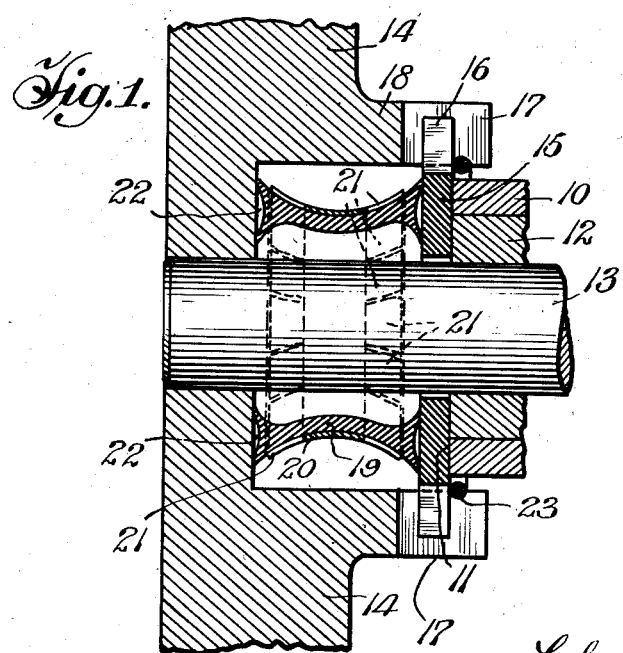
Fig. 1 is a sectional elevation of one embodiment of the invention.

With reference to Fig. 1, the pump housing has a cylindrical bearing member 10 which is provided with a machined, annular bearing surface 11 in a plane at right angles to the axis of the shaft. A bushing 12 or sleeve, which may be made of bronze or other suitable material, is positioned within the cylindrical extension 10 to form an anti-friction bearing for the rotatable pump shaft 13. Within the pump housing is the usual impeller 14 keyed to said shaft. A thrust washer and sealing member 15 is loosely positioned about the shaft 13 out of contact therewith and between the impeller and the smooth bearing surface 11 and rotates with the shaft, as hereinafter described. Said washer is made of Bakelite, carbon, non-abrasive metal, or of other suitable material which has the capacity of cooperating with the cast iron or other metallic bearing surface 11 to maintain a fluid-tight seal and having a low coefficient of friction when one annular surface is rotated with respect to the other.

Said anti-friction washer 15 is yieldingly held against the bearing surface 11 by the flexible sealing unit about to be described. Said washer is caused to rotate with the impeller by any suitable connections, as for example by radial ears or lugs 16 which are received in slots in the annular extension 17 on the impeller hub 18. It will be seen that when the washer 15 is thrust against the bearing surface, the fluid within the pump body is prevented from flowing inwardly between the two, toward the shaft.

Figure 2:
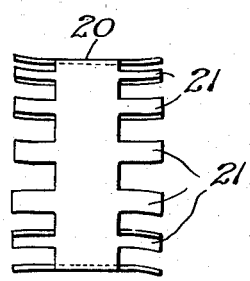
Fig. 2 is a side elevation of the spring member of the assembly.

The flexible sealing unit comprises a sleeve or collar 19 formed of deformable material such as rubber, synthetic material known as "Neoprene" or other flexible and liquid impervious material which is substantially free from deterioration under the specific conditions in which it may be used. The unit comprises also a spring material retaining ring 20, as shown in Fig. 2, and a plurality of resilient fingers 21 which extend axially and which flare outwardly to conform to and to embrace the outer surface of the flexible sleeve 19. Said spring may be stamped from tempered spring bronze or it may be otherwise formed of suitable flexible material.

The flexible collar 19 flares outwardly at both ends from the middle section, or, otherwise expressed, it is of generally cylindrical form but with its middle section of reduced diameter. Also, the wall is preferably thicker at the ends than in the middle, and each end surface has a shallow recess 22 therein acting somewhat as a suction cup to further seal against leakage at each end when the collar is compressed somewhat, as it is in service. The resilient fingers 21 also extend in opposite directions and embrace the flexible collar, as stated.

A retaining spring wire 23 is provided to hold the washer 15 in its recess in the impeller hub, when the parts are not fully assembled. It will be noted that the flexible collar does not depend on its seat in an annular recess to provide the necessary seal at one end but that both ends are sealed in the same manner by pressing against flat, parallel surfaces and being yieldingly held by the spring fingers whereby the device as a whole, when under compression longitudinally or axially, tends to expand radially also.

The flexible sealing collar is not subjected to wear by being pressed against a relatively movable surface but on the contrary the contacting surfaces at each end of said dollar do not rotate with respect to said collar, i. e. when one element rotates the adjacent element rotates also. The sealing unit has the advantage of the use of flexible rubber or Neoprene, and of the spring for making the same effective, but without necessarily combining the two members into a unitary structure and encountering some of the difficulties which are inherent in molding rubber around a spring. The two parts are manufactured separately and are readily assembled. Although the two concentric members of the unit are substantially cylindrical with flaring ends, the same may, of course, be made in more conical form.

Figure 3:
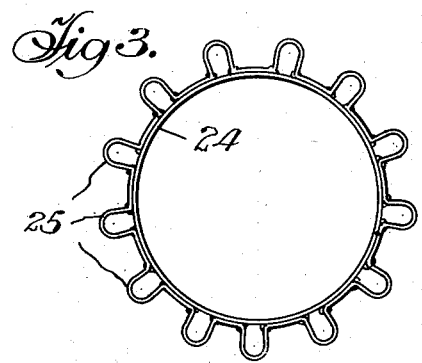
Fig. 3 is an end elevation of said spring.

Fig. 3 illustrates a modification of the spring construction which in this instance may comprise a retaining metal band 24 to which is secured a plurality of wire loops 25, extending in opposite directions. Said loops may be formed of spring brass or bronze, spring steel or the like and the loops at each end may comprise a single length of wire bent back and forth and secured by welding or by mechanical fastening devices.

Various changes may be made in the form and construction of the parts without departing from the spirit of the invention as expressed in the appended claim.

I claim:

A sealing unit comprising a sleeve of deformable material impervious to the liquid to be sealed, a retaining band of material around the same near the middle, resilient fingers extending in opposite directions from said band and engaging said sleeve near each end thereof, and shallow grooves in the opposite end faces of said sleeve.

CHARLES P. TEEPLE.